No. 869,310. PATENTED OCT. 29, 1907.
H. R. LEMLY.
MULTIPLE CARTRIDGE BOX.
APPLICATION FILED MAY 31, 1906.
2 SHEETS—SHEET 1.
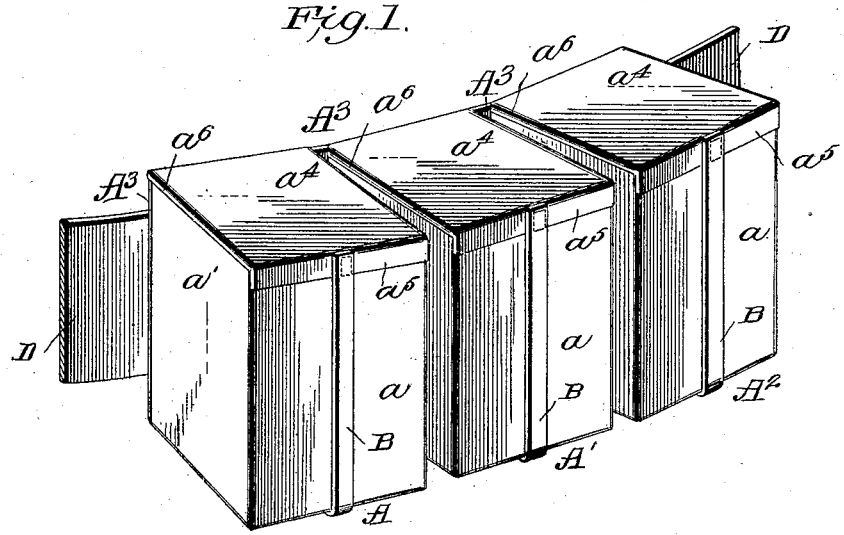
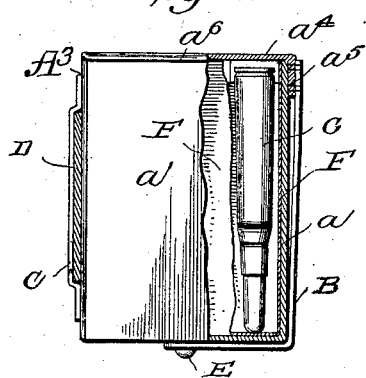
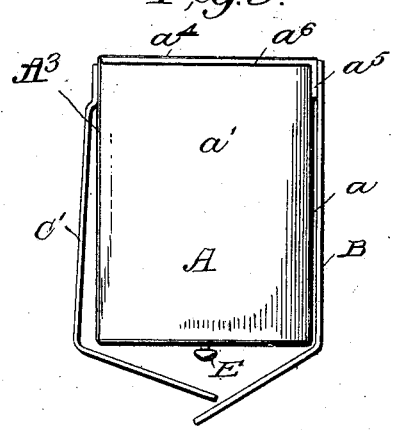
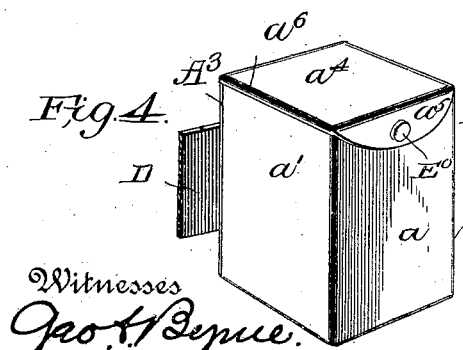
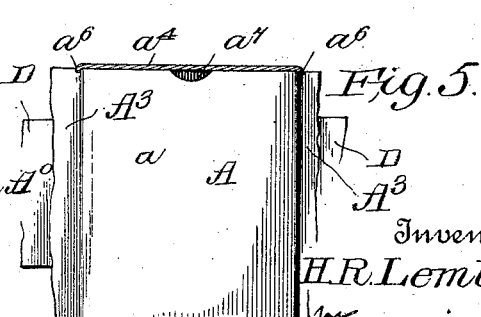
Witnesses
Geo. H. Byrne.
Samuel Turley.
Inventor
H. R. Lemly,
by Williamson + Fisher,
Attorneys.

No. 869,310.

PATENTED OCT. 29, 1907.

H. R. LEMLY.
MULTIPLE CARTRIDGE BOX.
APPLICATION FILED MAY 31, 1906.

2 SHEETS—SHEET 2.

Witnesses
Geo. F. Bruce.
Samuel Turley.

Inventor
H. R. Lemly,
by Wilkinson & Fisher,
Attorneys

THE NORRIS PETERS CO., WASHINGTON, D. C.

UNITED STATES PATENT OFFICE.

HENRY R. LEMLY, OF WASHINGTON, DISTRICT OF COLUMBIA.

MULTIPLE CARTRIDGE-BOX.

No. 869,310.     Specification of Letters Patent.     Patented Oct. 29, 1907.

Application filed May 31, 1906. Serial No. 319,568.

*To all whom it may concern:*

Be it known that I, HENRY R. LEMLY, a citizen of the United States, residing at Washington, in the District of Columbia, have invented certain new and useful Improvements in Multiple Cartridge-Boxes; and I do hereby declare the following to be a full, clear, and exact description of the invention, such as will enable others skilled in the art to which it appertains to make and use the same.

My present invention relates to improvements in multiple cartridge boxes, and it consists in providing a group of cartridge boxes connected together at their backs by a flexible strip and adapted to be detachably connected, as a group, to any suitable belt or band.

My invention also consists in certain novel features and details of construction, which will be hereinafter described and claimed.

Reference is had to the accompanying drawings, in which the same parts are indicated by the same letters throughout the several views.

Figure 6:
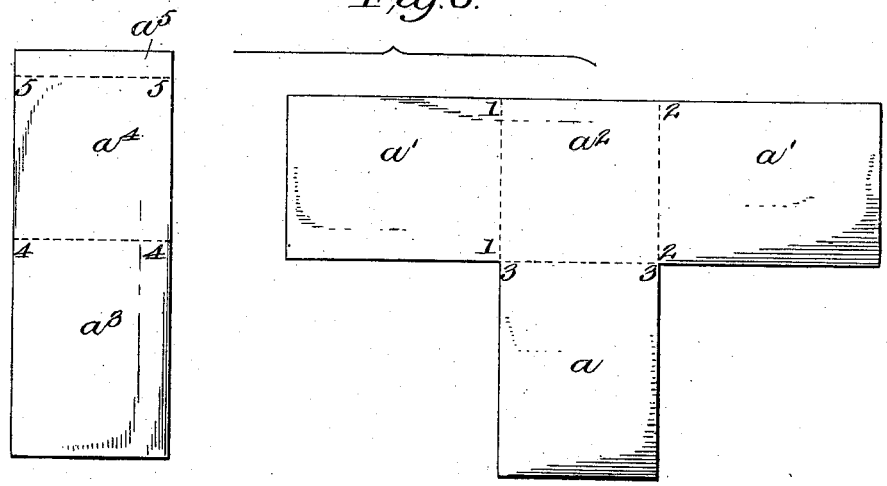

Figure 1 is a perspective view showing the multiple cartridge box attached to the belt. Fig. 2 shows a section through the belt with the corner of one of the boxes broken away. Fig. 3 is an end view of a box showing a modified form of device for attaching the same to the belt. Fig. 4 is a perspective view showing a cartridge box provided with the well known glove fastener for holding down the lid. Fig. 5 shows a front view of one of the boxes with the flap cut away to show the thumb notch. Fig. 6 shows the two blanks out of which the box may be constructed, and Fig. 7 shows another arrangement of blanks for constructing the box.

In Fig. 1, I have shown three boxes A, A', A², connected together by a suitable flexible strip A³. While I have shown three of these boxes as a preferable unit, any desired number of the boxes may be connected together to form a single detachable unit. These boxes may be made of leather, or other suitable material, but preferably of leather, and while I have shown the boxes as rectangular in shape, they may be made tapering towards the bottom to conform to the shape of the cartridges therein, if desired.

Each box comprises a front wall $a$, side walls $a'$, a bottom wall $a^2$, a back piece $a^3$, and a cover $a^4$, provided with a flap $a^5$. The sides of the cover may be crimped over the edges as at $a^6$.

Figure 7:
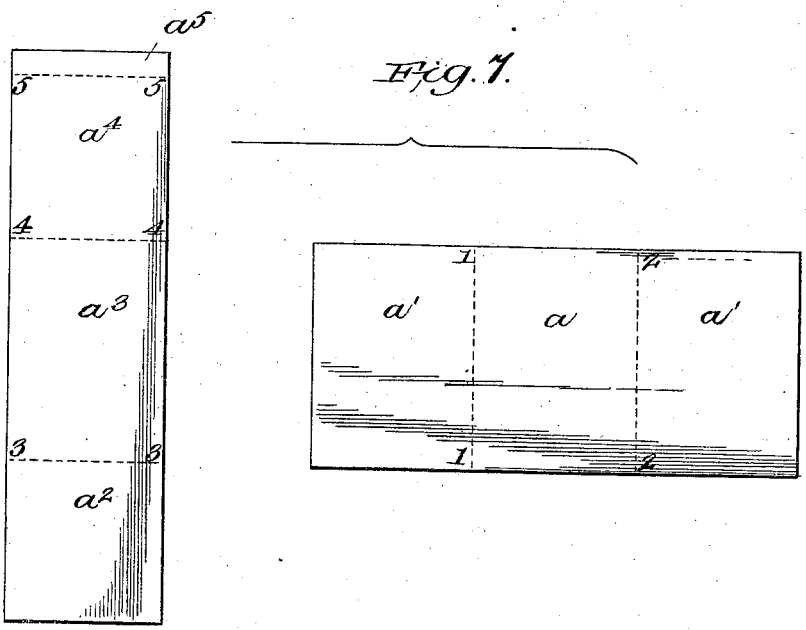

In the manufacture of the box, blanks similar to those shown in Figs. 6 and 7 may be bent up along the lines 1—1, 2—2, 3—3, 4—4, 5—5, the contiguous edges being sewed together, and the edges of the cover being crimped over, as at $a^6$, as shown in Figs. 1 to 5.

In order to secure the multiple box to the belt D, the said belt may be rove through loops C sewed to the strip A³, as shown in Fig. 2, or one or more straps C' may be provided, as shown in Fig. 3, which straps engage the button E in the bottom of the box.

The cover of the box is held in place by a suitable fastener, such as the strap B engaging the button E, as shown in Figs. 2 and 3, or the French glove fastener E⁰ may be used, as shown in Fig. 4. The front of each box should be notched at the top, as indicated at $a^7$ in Fig. 5, for convenience in catching hold of the cartridge clips. Each box is intended to hold a plurality of clips, and partitions may or may not be provided, as preferred, but in ordinary practice partitions will not be necessary.

It is generally convenient to insert one of the pasteboard boxes F, holding a group of clips, in the box, and these clips being generally assembled in groups of four, with five cartridges in each clip, the box may be conveniently constructed to hold snugly the pasteboard box including four of such clips. Where this pasteboard box is used, its top may be removed either before it is inserted in the cartridge box proper, or just before loading, as preferred. This pasteboard box adds stiffness to the structure, and renders it quite convenient to use the French glove fastener, as shown at E⁰ in Fig. 4.

It will be seen that by having a group of boxes connected together by a flexible backing to constitute a multiple cartridge box, that a series of these boxes may be readily attached to or removed from the belt of the soldier, and that this multiple cartridge box may be shifted as a unit along the belt of the wearer, and another multiple box brought into the convenient position for loading. Furthermore, the flexibility of the back enables the multiple box to adjust itself to the contour of the body of the wearer. This and the various other advantages of the herein described construction will be obvious to any one skilled in the military art.

Having thus described my invention, what I claim and desire to secure by Letters Patent of the United States, is:—

1. A multiple cartridge box comprising a flexible back and a series of small boxes connected to said flexible back, with means for movably attaching said back to the belt of the wearer, substantially as described.

2. A multiple cartridge box, comprising a flexible back, a series of leather boxes permanently secured to said back and provided with flexible tops, with means for fastening said tops down on the respective boxes, and means for movably and detachably connecting the flexible back to the belt of the wearer, substantially as described.

3. A multiple cartridge box, comprising a leather back, a series of leather boxes permanently secured to said back, a leather top for each box, and provided with a front flap and downwardly crimped edges, with means for detachably fastening said tops down on their respective boxes, and means for movably and detachably connecting the leather back to the belt of the wearer, substantially as described.

4. A multiple cartridge box comprising a flexible back, a series of leather boxes permanently secured to said back and provided with flexible tops, removable boxes containing cartridges adapted to fit into said leather boxes, with means for fastening the tops of the leather boxes down on the same, and means for movably and detachably connecting the flexible back to the belt of the wearer, substantially as described.

5. A multiple cartridge box comprising a flexible back, a series of leather boxes permanently secured to said back and provided with flexible tops, removable pasteboard boxes containing clips of cartridges adapted to fit into said leather boxes, with means for fastening the tops of the leather boxes down on the same, and means for movably and detachably connecting the flexible back to the belt of the wearer, substantially as described.

In testimony whereof, I affix my signature, in presence of two witnesses.

HENRY R. LEMLY.

Witnesses:
HENRY HASPER,
WOLDEMAR HAUPT.